United States Patent
Sclabos Katevas et al.

(10) Patent No.: US 10,059,904 B2
(45) Date of Patent: Aug. 28, 2018

(54) SOLVENT-FREE PROCESS FOR OBTAINING PHOSPHOLIPIDS AND NEUTRAL ENRICHED KRILL OILS USING MELTING AND EVAPORATION

(71) Applicant: THAROS LTD., Santiago (CL)

(72) Inventors: Dimitri Sclabos Katevas, Santiago (CL); Raul Toro Guerra, Santiago (CL)

(73) Assignee: Tharos Ltd., Santiago (CL)

( * ) Notice: Subject to any disclaimer, the term of this patent is extended or adjusted under 35 U.S.C. 154(b) by 0 days.

(21) Appl. No.: 15/526,617

(22) PCT Filed: Nov. 13, 2015

(86) PCT No.: PCT/IB2015/058789
§ 371 (c)(1),
(2) Date: May 12, 2017

(87) PCT Pub. No.: WO2016/075669
PCT Pub. Date: May 19, 2016

(65) Prior Publication Data
US 2017/0313956 A1    Nov. 2, 2017

Related U.S. Application Data

(60) Provisional application No. 62/079,864, filed on Nov. 14, 2014.

(51) Int. Cl.
*C11B 1/16* (2006.01)
*C11B 1/02* (2006.01)
(Continued)

(52) U.S. Cl.
CPC .............. *C11B 1/16* (2013.01); *A23D 7/0053* (2013.01); *A23D 7/011* (2013.01); *A23D 9/013* (2013.01);
(Continued)

(58) Field of Classification Search
CPC ................ C11B 1/02; C11B 1/06; C11B 1/16
See application file for complete search history.

(56) References Cited

U.S. PATENT DOCUMENTS 8,609,157 B2    12/2013 Sclabos Katevas et al.
8,772,516 B2    7/2014 Katevas et al.
(Continued)

FOREIGN PATENT DOCUMENTS

CN    102311868 A    1/2012
CN    102876444 A    1/2013
(Continued)

OTHER PUBLICATIONS

Whittaker, D.K.; Mechanisms of tissue destruction following cryosurgery; Annals of the Royal College of Surgeons of England, vol. 66; 1984; pp. 313-318.
(Continued)

*Primary Examiner* — Yate Kai Rene Cutliff
(74) *Attorney, Agent, or Firm* — Ladas & Parry LLP

(57) ABSTRACT

The invention relates to a new solvent-free process for simultaneously obtaining phospholipids-enriched krill oil and neutral lipid enriched-krill oil containing DHA and EPA poly-unsaturated fatty acids and astaxanthin and krill meal. The process includes preheating fresh minced krill followed by melting of the lipids using live steam injection to obtain a press liquid and a solid fraction; centrifuging the press liquid to obtain a phospholipids-enriched emulsion phase; evaporating the water of the emulsion using a thin film evaporator to obtain phospholipids-enriched krill oil; centrifuging the resulting decanter liquid to obtain neutral lipids enriched krill oil and stickwater.

19 Claims, 1 Drawing Sheet

(51) Int. Cl.
*C11B 1/06* (2006.01)
*A23D 7/005* (2006.01)
*A23D 7/01* (2006.01)
*A23D 9/013* (2006.01)
*A23D 9/04* (2006.01)

(52) U.S. Cl.
CPC .................. *A23D 9/04* (2013.01); *C11B 1/02* (2013.01); *C11B 1/06* (2013.01)

(56) References Cited

U.S. PATENT DOCUMENTS

| | | | |
|---|---|---|---|
| 9,028,877 B2 | 5/2015 | Bruheim et al. | |
| 9,034,388 B2 | 5/2015 | Bruheim et al. | |
| 9,072,752 B1 | 7/2015 | Bruheim et al. | |
| 9,078,905 B2 | 7/2015 | Bruheim et al. | |
| 9,119,864 B2 | 9/2015 | Bruheim et al. | |
| 9,320,765 B2 | 4/2016 | Bruheim et al. | |
| 9,375,453 B2 | 6/2016 | Bruheim et al. | |

FOREIGN PATENT DOCUMENTS

| | | | | |
|---|---|---|---|---|
| WO | 2007080515 A1 | | 7/2007 | |
| WO | WO-2007/080514 | * | 7/2007 | ............... C11B 1/10 |
| WO | 2009027692 A2 | | 3/2009 | |
| WO | 2011051743 A1 | | 5/2011 | |
| WO | WO-2011/051743 | * | 5/2011 | ............. A23D 9/007 |

OTHER PUBLICATIONS

Virtue, P. et al.; Changes in the digestive gland of Euphausia superba during short-term starvation: lipid class, fatty acid and sterol content and composition; Marine Biology, vol. 117; Springer-Verlag 1993; pp. 441-448.

Mayzaud, P. et al.; Changes in lipid composition of the Antarctic krill *Euphausia superba* in the Indian sector of the Antarctic Ocean: influence of geographical location, sexual maturity stage and distribution among organs; Marine Ecology Progress Series, vol. 173; published Nov. 12, 1998; pp. 149-162.

Hoem, Dr. N.; Presentation: Composition of Antarctic krill oil and methods for its harvesting, production and qualitative and quantitative analysis; Aker BioMarine, Newcastle, Australia, Nov. 2013; pp. 1-41.

Villanyi Kelemen, K.; International Search Report and Written Opinion of the International Searching Authority, issued in International Application No. PCT/IB2015/058789; dated Apr. 4, 2016; 11 pages.

* cited by examiner

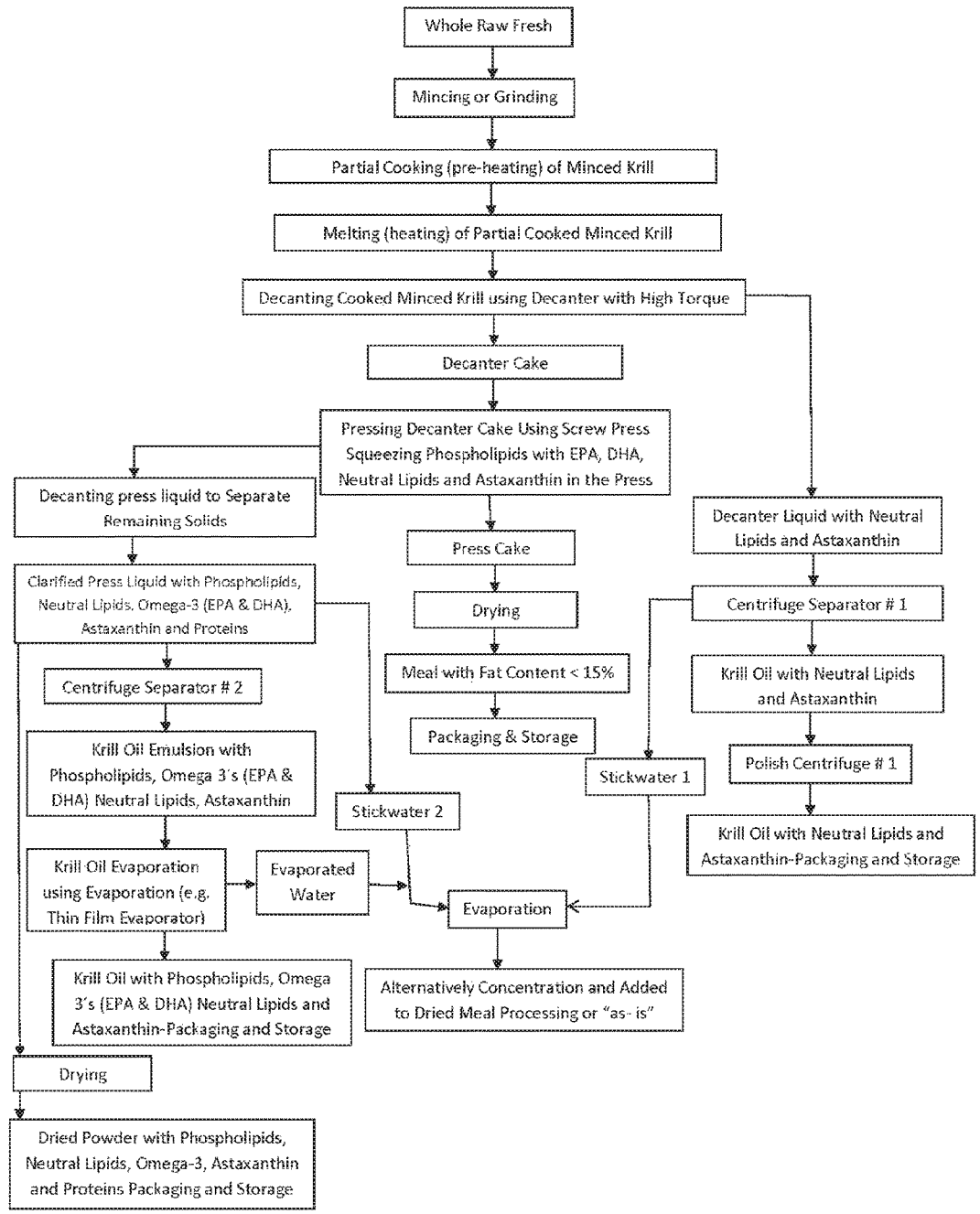

SOLVENT-FREE PROCESS FOR OBTAINING PHOSPHOLIPIDS AND NEUTRAL ENRICHED KRILL OILS USING MELTING AND EVAPORATION

FIELD OF THE INVENTION

The present invention relates to a new on board (at sea) and/or on shore (on land) process for simultaneously obtaining both krill oils: phospholipids-enriched krill oil and neutral lipid enriched-krill oil containing DHA and EPA poly-unsaturated fatty acids and astaxanthin and krill meal.

BACKGROUND OF THE INVENTION

Krill corresponds to a group of small and abundant marine crustaceans in the order Euphausiaceae, living in the South Antarctic Ocean. The Antarctic krill, in particular those that live at the Antarctic and sub-Antarctic regions, are composed of 11 *Euphausia* species, being dominant *Euphausia superba, Dana* and *Euphausia crystallorophias*.

Several efforts have been made to produce phospholipids-enriched krill oils containing docosahexaenoic acid (DHA) and eicosapentaenoic acid (EPA) associated to low-fat krill meal at an industrial scale. Several different cooking temperatures, different decanting torque, strong pressing, using two decanting steps, washing the first decanter solids with stick water before the second decanter, electro-plasmolysis and several other methodologies have been tested. However, see for example, U.S. Pat. Nos. 8,772,516 and 8,609,157 which provide methods to extract phospholipids-enriched krill oil based on physical-mechanical steps associated to a krill meal plant without the use of organic and/or inorganic solvents.

From the current traditional krill meal processing layouts used on board some factory trawlers, only a very small amount of krill oil is manufactured. This krill oil is usually enriched in neutral lipids with very low or undetectable amount of phospholipids. Normally, during the traditional on board (at-sea) krill process, fresh krill is heated using an indirect steam heating cooker with a rotating screw conveyor, followed by twin-screw pressing and drying. The press liquid obtained by the twin-screw press is passed through a decanter to remove the insoluble solids. The clarified decanter liquid is then used to feed separators centrifuges to separate the krill oil normally enriched with neutral lipids and astaxanthin. In this traditional process the phospholipids are bound to the proteins in the press cake. Therefore, phospholipids are usually found associated to the krill meal.

When non-traditional krill meal-processing layout is used on board at sea, it results in a similar situation as explained above. Normally, the non-traditional krill meal plant considers a contherm cooker system, a two-phase decanter or three-phase decanter and a drier. These decanters are used for de-watering and de-fatting the cooked krill. The decanter liquid is used to feed the centrifuge separators to obtain usually a neutral lipid-enriched krill oil with low or undetectable levels of phospholipids. In this case, the phospholipids are also bound to the proteins in the decanter solids. As described above, phospholipids are found in the krill meal.

Currently all phospholipids-enriched krill oil production processes are operated through on-land extraction technologies either based on whole fresh, frozen krill or dried krill meal as raw materials. This is due to the fact that these processes are solvent-based and consequently strictly forbidden to operate on-board fishing vessels.

SUMMARY OF THE INVENTION

The invention relates to a solvent-free process for preparing krill oil comprising mincing or grinding whole raw krill to form minced krill, preheating the minced krill and contacting the preheated minced krill with a direct steam injection at a certain pressure and time to obtain melted krill with polyunsaturated fatty acids DHA and EPA linked to the phospholipids fraction, with astaxanthin, and neutral lipids coming from the meal processing line which is used for human health applications, while the resulting krill meal has a low fat content. The invention also discloses a procedure for obtaining dried complex that contains krill oil in combination with phospholipids linked to DHA and EPA, proteins and astaxanthin.

BRIEF DESCRIPTION OF DRAWINGS

The present invention will be further understood and appreciated by reading the following description in conjunction with the accompanying drawing, in which:

FIG. 1 is a flowchart describing the process of the present invention.

DETAILED DESCRIPTION OF THE INVENTION

The present invention provides a solvent-free process for preparing marine oil from a marine and/or aquatic biomass. All products obtained with the procedure disclosed in this invention are produced entirely free of any type of organic solvents and/or $CO_2$ supercritical fluid and/or enzymes for separating the krill oil.

In the present invention a new procedure for phospholipids extraction from fresh krill, similar crustaceans and other marine resources is disclosed.

The present invention allows a much more efficient phospholipids extraction process and it is performed almost immediately after raw fresh krill has been captured at sea. This process guarantees the use of highly fresh, minced or fractioned raw krill, avoiding phospholipids decomposition and/or lipids deterioration.

This procedure is based on a process where raw fresh krill is minced in order to leave the material more exposed to the processing conditions disclosed herein and its components and structure available for further application of steam thereby facilitating the melting of the fat fraction, mainly phospholipids, jointly with EPA and DHA. Mincing krill provides better phospholipids extraction compared to whole raw krill. The screw pump used to feed the cooker is enough to reach the desired mincing, leaving the krill structure open and exposed to the steam-melting action and later phospholipids extraction.

Thus, the present invention provides a solvent-free krill oil process comprising:

a) mincing or grinding whole raw krill and/or a krill fraction to form minced krill;

b) preheating the minced krill to a temperature of at least about 20° C. for at least about 1 minute;

c) contacting the preheated minced krill with a direct steam injection at a pressure of at least 100 kPa for about 1 minute until the preheated minced krill reaches a temperature of at least 97° C. thereby transforming the preheated minced krill to melted krill containing a partially de-fatted and de-watered solid and a liquid;

d) separating the partially de-fatted and de-watered solid and a liquid from the melted krill;

e) squeezing the partially de-fatted and de-watered melted solid to obtain a press liquid having residual solid particles and a solid fraction;

f) separating residual solid particles from the press liquid to obtain a substantially residual solid, particle-free press liquid; and g) phase-separating the substantially residual solid, particle-free press liquid to obtain an emulsion comprising krill oil enriched in phospholipids with Eicosapentaenoic acid (EPA) and Docosahexaenoic acid (DHA) emulsified with water, proteins and astaxanthin.

More particularly, the preheating step uses preferably a continuous cooker to elevate the temperature from about 0° C. to 57° C. with indirect steam heating. When reaching 57-60° C., krill starts to coagulate and the krill texture changes, becoming elastic and rubbery. The krill sticks inside the cooker, blocking the system, preventing a smoother flow.

In a preferred embodiment, the minced krill is partially cooked (pre-heated) in a cooker with indirect and/or direct steam heating or another heating system, but at a low rotation speed preferably 1-300 rpm, to avoid over-emulsification. The krill temperature at the exit of the cooker of the pre-heated krill material is preferably 40-60° C. before the krill starts to coagulate and the krill texture changes, becoming elastic and rubbery, the krill becoming sticky inside the cooker, blocking the system and preventing a smoother flow.

The type of cooker is not particularly restricted but as preferred embodiment this cooker must operate without excessive agitation to avoid over-emulsification.

In another preferred embodiment, the krill is fed to the cooker using a screw pump, or a belt conveyor, or a screw conveyor or any other transport system avoiding the excessive krill agitation to avoid the over-emulsification.

In another embodiment, the fresh whole krill or fraction is minced, prior to the cooking step, using a fish de-boner, preferably with holes of a diameter of the drum of about 5 mm. A meat grinder with plates having holes of a diameter of about 5 mm, a screw pump to transport the raw krill to the cooking system can be used; or any other equipment that helps reduce the krill size preferably to 1-20 mm and at all time avoiding excessive agitation of the minced method in order to avoid an over-emulsification of the resulting oil. Combined with protein and water the phospholipids acts as the emulsification agent.

Since raw fresh krill is soft and fragile, the low speed of the rotor of the feeding screw pump to the cooker is one of the preferred options to achieve good mincing of the raw fresh krill.

In one embodiment, the process according to the invention as described above, the mincing or grinding of step a) is carried out using a screw pump, a meat grinder with plates containing holes or a fish deboner.

In another embodiment, the process according to the invention as described above, the mincing or grinding of step a) reduces the krill and/or krill fraction in size to about 1-20 mm, preferably to about 1-15 mm, more preferably to about 1-10 mm, or yet more preferably to about 2-5 mm in diameter or length depending upon the type of the mincing equipment used.

However the present invention is not limited to any specific mincing system.

The purpose of mincing is to expose the inner structure of the krill material to the steam-melting action and later allow phospholipids extraction. Mincing krill results in higher phospholipids extraction efficiency than when using whole raw krill.

The present invention provides Examples where minced krill is obtained using a screw pump with a rotor speed of about 90 rpm.

According to the present invention, the cooking step uses a continuous melting heater with live steam injection applied through nozzles located throughout the entire melting heater length increasing krill temperature from about 57° C. to 97° C. The steam is injected at a high pressure of about 6 bar or more. With live steam injection, coagulation is controlled avoiding krill's rubbery and sticky condition. This is essential to melt viscous phospholipids and later release phospholipids in a more abundant quantity to the press liquid using live steam injection at high pressure in the melting heater.

In a certain embodiment, the heating step of the preheated minced krill is carried out using a direct steam heating system.

In another embodiment, the minced krill is pre-heated to a temperature of about 20-70° C., preferably about 20-60° C., and more preferably about 50-60° C.

As a preferred embodiment, the krill material after the partial cooking (pre-heating) is immediately melted with abundant live steam injection at a high pressure, preferably about 3-6 bar, preferably using a cylindrical melting heater with several nozzles located throughout the entire length of the heater. The melting heater has a screw conveyor working at a low rotation speed preferably at 1-30 rpm allowing the krill be transported and exposed to the live steam action, with a residence time of about 1-10 minutes for an efficient phospholipids' melting. Krill phospholipids have a high viscosity, thus, in order to obtain a high phospholipids release in the press liquid this melting step is necessary.

In one embodiment, the heating of the preheated minced krill is carried out using direct live steam injection.

In a further embodiment, the direct live steam injection is effected through a tube or cylinder with several nozzles that inject live steam either partially or throughout the entire extension of the tube or cylinder system.

In another embodiment, the heating of the preheated minced krill is heated to a temperature of about 100-200° C., preferably about 120-180° C., or more preferably about 130-150° C.

The process according to the invention, wherein the heating step is carried out using direct live steam injection can additionally employ a screw conveyor working at low rotation speed of about 1-100 rpm, preferably about 2-70 rpm is employed, more preferably about 3-50 rpm, yet more preferably about 5-10 rpm is employed.

As a certain embodiment the krill temperature in the melting heater is increased from about 60° C. to about 97° C. Simultaneously, the abundant live steam injected allows to wet the krill and achieve a good coagulation process, preventing its hardening and sticking in the heater.

The present invention demonstrates in the examples that the higher the steam temperature, the higher the phospholipids extraction through a more efficient melting activity, as the phospholipids become less viscous thereby facilitating their migration off the matrix once pressed (to the oil fraction).

The melting heater type is not particularly restricted but as a preferred embodiment this heater must operate with live steam injection at a high pressure.

In one embodiment, the melted krill is decanted using a high-torque decanter in order to obtain a partially de-fatted and de-watered solid, and a decanter liquid. The decanter must be adjusted preferably at about 1.8~2.5 kNm, with a differential speed-control of the conveyor and krill fed at a temperature of about 93~96° C. in order to squeeze-out as much neutral lipids as possible from the cooked/melted krill into the decanter liquid, being phospholipids more concentrated in the descanter solid phase.

A decanter may not be necessary when the direct feeding of the krill from the melting heater to the press already provides higher phospholipid extraction levels. However, a decanter can be useful in releasing free water from the krill and the water from the live steam added during the melting process. By removing as much water through the use of the decanter, the pressing performance can be improved and a higher release of lipids into the press liquid can be obtained. Additionally, the decanter is useful in removing important neutral lipids into the decanter liquid thereby concentrating the phospholipids in the decanter cake.

As a preferred embodiment, the melted krill follows a decanting stage using a decanter centrifuge preferably with high a torque of 1-100 kNm, preferably of 1-10 kNm, with a speed of 100-10,000 rpm, preferably 1,000-5,000 rpm, separating the melted material into a partially de-watered and partially de-fatted decanter solid phase and a decanter liquid phase.

In one embodiment, the process according to the present invention, wherein the step of separating the melted krill to obtain a partially de-fatted and de-watered solid and a liquid and the step of separating residual solid particles from the press liquid obtained thereof is carried out by a decanter.

In a further embodiment, the torque of the decanter is about 1-100 kNm, preferably about 1-70 kNm, more preferably about 1-40 kNm and more preferably about 1-10 kNm.

In another embodiment, the decanter has a speed of about 100-10,000 rpm, preferably about 1,000-8,000 rpm, and more preferably about 2,000-5,000 rpm.

The moisture content of decanter solid is about 50-70%, even more preferably 58-65%. In some embodiments, the decanter type is not particularly restricted to any specific type of decanter, but can be selected from among a traditional decanter, a two-phase decanter and a triple-phase decanter.

According to the present invention, the decanter solid phase is fed to a screw press using a screw conveyor where it is pressed using preferably a continuous twin screw press with a high pressing force, releasing oil with melted phospholipids mixed with neutral lipids and astaxanthin into the press liquid. The pressing step is carried out by continuous pressing, at a full feeding condition and decanter solids' temperature fed at 93~96° C. using the screw at a low speed of 1 to 10 rpm. The screw press, using a small live steam injection, improves krill oil release.

The decanter solid phase keeps all melted phospholipids inside the coagulated protein. Then, a strong pressing condition of the decanter solids releases an important percentage of phospholipids to the press liquid.

As a preferred embodiment the pressing step is carried out by continuous pressing at a full feeding condition using a screw speed of 1-100 rpm, preferably 1-10 rpm and the temperature of the decanter solid of about 50-125° C., preferably 90-100° C.

In one embodiment, wherein the squeezing of the partially de-fatted and de-watered melted solid to obtain a press liquid and a solid fraction is carried out by feeding the solid to a screw pump and/or a screw conveyor and/or any other feeding system avoiding agitation, and pressing the melted solid using a screw press with a speed of about 1-100 rpm, preferably about 1-70 rpm, more preferably about 1-50 rpm, yet more preferably about 2-10 rpm.

In another embodiment, wherein the squeezing of the partially de-fatted and de-watered melted solid to obtain a press liquid and a solid fraction is carried out by feeding the solid to a screw pump and/or a screw conveyor and/or any other feeding system avoiding agitation, and pressing the melted solid using a screw press and wherein the temperature of the de-watered solid is about 50-125° C., preferably about 70-100° C., more preferably about 85-98° C., yet more preferably about 90-96° C.

In the process according to the present invention, the screw press in the step of squeezing the partially de-fatted and de-watered melted solid to obtain a press liquid and a solid fraction is selected from the group consisting of a simple screw press and a twin-screw press.

The present invention, optionally, also generates a dried complex containing krill oil with phospholipids, DHA and EPA, plus proteins and astaxanthin. This complex is obtained by drying the press liquid as-is without centrifuge separation. Such dried complex corresponds to a human-grade krill-related product.

The dried krill oil obtained according the present invention is characterized by a phosphatidylethanolamine content greater than 7.3% from the total lipids, or equivalent to above 18% out of the total phospholipids content. In one embodiment, the dried krill oil has a phosphatidylethanolamine content of 9.5% from the total lipids, or 20.60% out of the total phospholipids content.

According to the present invention, the press liquid has a high fat content in the range of 5 to 20% (wet base), depending on the seasonal lipid content. According to the process disclosed in the present invention, this press liquid has a high fat content in the range of about 2-25%, preferably 5-20% (wet base), depending on the seasonal lipid content of raw krill and if it is in an emulsified form.

The lipid content of the press liquid, in the fatty krill period, has about 30 to 45% of phospholipids and about 55 to 70% of neutral lipids.

The press liquid has suspended solids at about 5-10% from the minced decanter solids that pass through the press screen. To avoid blocking, these solid particles must be separated before feeding the press liquid to the centrifuge separator using a decanter or a rotary brush strainer.

The resulting press liquid is emulsified mainly by the action of direct steam injection at high pressure from various nozzles throughout the melting heater, producing agitation inside of the equipment, phospholipids acting themselves as an emulsifying agent. Applying different conditions to break this emulsion, such as nitrogen bubbling injection, freezing and acid and salt addition, among other processes, none of them has proven to be successful.

An emulsion is generated inside the melting equipment as high-pressure (e.g., 3-5 bar) live steam is applied to the minced krill through various nozzles throughout the entire length and residence time. This process generates high turbulence/agitation which favors the emulsion formation where phospholipids act as the emulsification agents.

Through the melting stage, maximum amount of phospholipid is extracted due to the fact that the higher the emulsification process where the phospholipid act as the emulsifying agent, the higher the phospholipid content that can be extracted.

In the process according to the invention, wherein the phase-separation of the press liquid to obtain krill oil enriched in phospholipids with EPA and DHA emulsified with water, proteins and astaxanthin and where the phospholipids act as emulsification agents is effected by the use of a separator centrifuge.

In one embodiment, the separator centrifuge is operated at a temperature of about 10-140° C., preferably about 15-130° C., more preferably about 20-125° C., and yet more preferably about 25-121° C.

According to the present invention, the press liquid is fed to the separator centrifuge at 90-95° C. preferably with a special limiting ring to reduce the emulsification action of the displacement water.

The separator centrifuge used in the instant invention has a light component discharge and a heavy component discharge. From the light component discharge, a water emulsion or oil-in water emulsion is released, preferably an oil-in-water emulsion. This oil-in water emulsion has water content preferably about 25-70% and phospholipids content preferably about 15-50% (dry base) subject mainly to the krill season.

As a preferred embodiment, the press liquid is fed to a separator centrifuge at a temperature of about 90-95° C. surprisingly obtaining, from the light phase (or light component) discharge, a phospholipids enriched emulsion with a water content of about 25-70% and a high phospholipids content preferably of about 15-20% w/w (wet base) equivalent to a phospholipids content of about 33-50% w/w (dry base).

From the heavy component discharge of the separator centrifuge used in the instant invention, stick water is released with preferably about 90~95% moisture and with lipids of about 1~3%.

In one embodiment, the process according to the invention further comprises removing the water from the emulsion to obtain a dried krill oil which is enriched in phospholipids with EPA and DHA in combination with astaxanthin and the removal of water is effected by evaporation.

In the process according to the invention, the evaporation is carried out using a high vacuum pressure equivalent of about 10-80 mbar, preferably about 15-65 mbar, more preferably about 20-45 mbar, and yet more preferably about 25-35 mbar.

According to the present invention, to evaporate the water from the emulsion it is preferably used an horizontal thin film evaporator drying the phospholipids emulsion down to 1% of water content, being the preferably heating temperature evaporation conditions range 40 to 90° C. and a pressure of 25 to 50 mbar.

In a certain embodiment, the water content of the dried krill oil is less than 8%. In another embodiment, the water content of the dried krill oil is about 2-7%, preferably about 2-6%, or more preferably less than 1%.

As a preferred embodiment, the water from the emulsion is evaporated using a thin film evaporator using a temperature of 40-100, preferably about 60-80° C., using vacuum conditions with a pressure of 20-50 mbar, even preferably of 25-40 mbar obtaining an enriched phospholipids krill oil with a moisture content of less than 1%.

The present invention is not limited to any particular type of evaporator or drier system to evaporate the water from the emulsion avoiding their thermal damage.

Using the horizontal thin film evaporator, it is obtained an homogeneous dried phospholipids enriched krill oil for human health applications with preferably phospholipids content of 15-50% w/w, EPA and DHA content preferably of 10-50% w/w and astaxanthin of 400-1 500 ppm .

The neutral lipid enriched krill oil produced from the decanter liquid of the present invention is also useful for human health applications, having a content of neutral lipids preferably from 70 to 100% w/w, DHA and EPA content are preferably from 5 to 35% w/w and astaxanthin content preferably from 400 to 1 600 mg/kg.

The krill meal obtained with the present invention has a fat content ranging from 5 to 15%, protein content from 60% to 70%, and moisture content from 6 to 10%.

As a preferred embodiment, the marine biomass is krill, preferably the Antarctic krill *Euphausia superba*. Other krill species or crustacean or fish species or marine species can also be processed using the systems and processes of the present invention. Examples of such species are *E. crystallorophias, E. frigida, E. tricantha, E. vellantini, E. lougirostris, E. lucens, E. similis, E. spinifera, E. recurva, E. pacifica, Thysanoessa macrura, T. vicinia, T. gregaria, T. raschii, T. inermis, Pandalus borealis, Cervimunida johni, Heterocarpus reedi* or *Pleuroncodes monodom*. The krill is preferably processed in a fresh state as defined herein.

The present invention can also be applied to other marine species and or aquatic resources such as salmon, squid, seaweed, etc. for producing oil for human consumption.

While frozen krill can be used, it is not preferably used with the process of the present invention as ice crystals can be generated during krill freezing which can disrupt the anatomical structures of the crustacean. Destruction of tissues by freezing is a well-established subject in the state of art (Whittaker D K. 1984. Mechanisms of tissue destruction following cryosurgery. Ann R Coll Surg Engl. 66:313-318).

As a preferred embodiment, the krill is processed fresh on board a fishing vessel, a factory trawler, mother factory vessels, intermediate processor or similar, or other ship suitable to carry out the process of this invention within a term of 14, 12, 10, 8, 6, 5, 4, 3, or preferably 2 hours of catching krill.

In some embodiments, the krill is processed on board a ship within 1 hour, or preferably 0.5 hours, or more preferably within 20 minutes, after catching the krill. Within the embodiments of the present invention, it is included that the ship tows a trawl that is configured to catch the krill and/or that the ship receives its krill or other species from fishing vessels or other factory trawlers. The krill is then transferred from the trawl to the ship and processed, preferably immediately after krill catching. The trawl comprises (either a regular fishing gear composed of trawls and/or purse seining system) and/or a pumping system to pump the freshly caught krill from the trawl to the ship so the krill can be processed in a fresh state.

As a preferred embodiment, in the process of the present invention, the obtained decanter liquid is passed through a separator centrifuge and then through a purifier separator centrifuge, obtaining stickwater and krill oil enriched with neutral lipids with astaxanthin and essentially free or non-detectable phospholipids. The obtained stickwater has a low fat content of about 0.3-0.5%.

EXAMPLES

The present invention will be described in more detail using examples. It should be understood that the present invention is not limited by the following examples.

Example 1

Comparison of Processes Using Minced or Whole Fresh Krill

The krill used at sea on board a factory vessel at a pilot level test has a freshness of 1-2 hours after catch. The krill was captured in South Georgia Island during the low fat period of the resource. Minced krill was obtained using a screw pump with a rotor speed of 90 rpm while it was fed continuously to the cooker. Both, whole krill and minced krill tests were carried out separately on the same day, using 150 kg of whole and 300 kg of minced krill, applying the following processing steps according of the present invention using a pilot plant with a continuous process:

a) The first partial cooking step elevates the fresh raw krill temperature from about 0° C. to about 55-60° C. using a continuous screw cooker with indirect steam heating with a screw rotating speed of 3 rpm with a krill residence time of about 9 minutes.

b) Immediately after the melting step was applied using live steam injection at a pressure of 3-5 bar using a continuous cylindrical melting equipment with 12 steam injections nozzles distributed in the entire length of the equipment with a screw conveyor speed of 8 rpm and regulating the residence time of the krill in about 80 seconds. Krill temperature at the exit of the melting heater was about 93-96° C.

c) The melted krill at a temperature of about 90-95° C. was fed directly to the screw press without using a decanter centrifuge. It was pressed using a continuous single screw press at a speed of about 1 rpm, producing a press liquid and a press cake.

d) The resulting press liquid from the test, either using whole or minced krill of the present invent, had lipids and water content shown in table 1 which was fed separately to a separator centrifuge that worked at a speed of 10,000 rpm and a temperature of about 90-95° C. The resulting product obtained from the minced krill test out of the light phase discharge was a phospholipids' enriched emulsion with phospholipids content of 17.8% (wet base) and a water content of 55.3%; for the whole krill test out of the light phase discharge, the resulting product was a phospholipids' enriched emulsion with phospholipids content of 3.9% (wet base) and a water content of 6.3%.

e) Then, later the water from the emulsion was evaporated using a laboratory thin film evaporator using a temperature of about 70-89° C., a pressure of 25-30 mbar and a residence time of 20-30 minutes. With these operational evaporation conditions the water was easily removed to less than 1%.

Table 1 shows the total phospholipids in the krill oils with the water removed to less than 1%. These results show that mincing of the fresh krill is better for phospholipids extraction than using whole krill in the present invent.

Example 2

Comparison of Processes Using Melting and No Melting of Minced Fresh Krill

Table 2 shows the phospholipids content in the krill oil obtained from the present invention, using melting heater or without the use of a melting heater.

Fresh krill was used while running tests on board a factory vessel operating at sea at a pilot scale. It had a freshness of 1-3 hours after catch. For both of the tests made separately, using or not using a melting heater, the following processing steps were applied according to the present invention using a pilot plant running in a continuous processing mode:

1. Melted Krill Process a) About 200 kg of fresh raw krill was minced using a screw pump with a rotor speed of 90 rpm and it was continuously fed to the cooker.

b) The first partial cooking step of the minced krill used a continuous screw cooker with an indirect steam heater at a screw speed of about 3 rpm with a krill residence time of about 9 minutes and an exit temperature of 55-60° C.

c) Melting was applied immediately after partial cooking using live steam injection at a pressure of 3-5 bar using a continuous cylindrical melting equipment with 12-steam injection nozzles distributed throughout the entire length of the equipment with a screw conveyor working at speed of 8 rpm which was used to regulate the residence time of the krill for about 80 seconds. Krill temperature at exit of the melting heater was 93-96° C.

d) The melted krill was fed at 90-95° C. to a decanter centrifuge running at 5.040 rpm and a differential speed of 14 rpm, producing decanter solid and decanter liquid.

e) The decanter solid, at about 80-90° C., was pressed using a continuous single screw press at a speed of about 1 rpm, producing press liquid and press cake. The press liquid had a lipid content of 3.5% % and a water content of 91.1%.

f) The press liquid, at 90-95° C., was fed to a separator centrifuge at a speed of 10,000 rpm, discharging a light phase containing a phospholipids-enriched emulsion with a phospholipids content of 21.0% (Wet Base) and a water content of 54.3%.

g) Thereafter, the water from the emulsion was evaporated using a laboratory thin film evaporator using a temperature of about 70-89° C., a pressure of about 25-30 mbar and a residence time of 20-30 minutes. With these

TABLE 1

Phospholipids content in krill oil using whole or minced fresh krill of the present invent

| Date/Fishing Groung (2013) | Raw krill | | Qty. used (kg) | Whole or Minced | Press liquid | | Phosphol. Emulsion** | | Total Phospholipids in krill oil w/w(%) |
|---|---|---|---|---|---|---|---|---|---|
| | Lipids (%) | Water (%) | | | Lipids (%) | Water (%) | Phospholipids (%) | Water (%) | |
| 04 jul/SGI * | 3.6 | 78.7 | 300 | Minced | 3.5 | 91.0 | 17.8 | 55.3 | 43.5 |
| 04 jul/SGI | 3.7 | 78.7 | 150 | Whole | 1.9 | 92.4 | 3.9 | 6.3 | 4.2 |

* SGI: South Georgia Island
**Phospholipids' enriched emulsion from the light phase discharge of the separator centrifuge operational evaporation conditions the water was easily removed reaching less than 1% content.

2. Non-Melted Krill Process a) About 600 kg of fresh raw krill material was minced using a screw pump with a rotor speed of 90 rpm continuously feeding the cooker.

b) The single cooking step, without any further melting step, used a continuous screw cooker with indirect steam heating and a small direct live steam addition, with a screw speed of about 1.5 rpm and a krill residence time of about 12 minutes elevating the krill temperature from about 0° C. to 93-96° C.

c) The subsequent processing steps were similar to the conditions indicated on previous point 1 above for steps d) to h). The press liquid from the test without using any melting of krill of the present invention had a lipid content of 3.7% and a water content of 85.9%.

The press liquid was fed to a separator centrifuge at a temperature of 90-95° C. and it did not produce any emulsion from the light phase discharge, being mainly neutral oil what was discharged with only 1.7% of total phospholipids, which strongly suggests that the melting heater generates the emulsion.

Table 2 shows the total phospholipids content in the krill oils with the water removed to less than 1%. These results show that melting (yield 46.0%) minced fresh krill is better for phospholipids extraction compared when using no melting (yield 1.7%) of minced fresh raw krill in the present invention.

screw speed of about 3 rpm with a krill residence time of about 9 minutes and an exit temperature of 55-63° C.

The melting in all the tests was applied immediately after the partial cooking using live steam injection at pressure of 3-5 bar using a continuous cylindrical melting equipment with 12-steam injection nozzles distributed throughout the entire length of the equipment, with a screw conveyor working at a speed of 8 to 20 rpm regulating the different residence time of krill from 35 to 80 second according to the test design. Krill temperature at the exit of the melting heater in all the tests was 96-98° C.

Different residence times and operating conditions of krill processed in the melting heater were used, as follows:

a) For tests carried out on 22 Jun. 2013, the pilot plant used in the process of the present invention worked continuously for 3-4 hours with about 350 kg of fresh krill and a residence time of 35 seconds (screw speed 20 rpm) for the krill inside the melting heater. Afterwards, the melting equipment worked continuously for another 3-4 hours with about 350 kg of fresh krill and a residence time of 62 seconds (screw speed of 12 rpm) of the krill in the melting heater.

b) For tests carried out on 27 Jun. 2013, the pilot plant used in the process of the present invention worked continuously for 6-7 hours with about 500 kg fresh krill and a residence time of 62 seconds (screw speed 12 rpm) for the krill inside the melting heater.

c) For tests carried out on 28 Jun. 2013, the pilot plant used in the process of the present invention worked

TABLE 2

Phospholipids content in krill oil using melting and without melting of the present invention

| Date/Fishing Ground (2013) | Raw krill | | | Whole or Minced | Melting Heater used | Phospholipids Emulsion (***) | | Total phospholipids lipids in krill oil w/w(%) |
|---|---|---|---|---|---|---|---|---|
| | Lipids (%) | Water (%) | Qty. used (kg) | | | Phospholipids (%) | Water (%) | |
| 03 jul/SGI * | 3.6 | 78.7 | 200 | Minced | Yes | 21.0 | 54.3 | 46.0 |
| 19 apr/Orkney(**) | 4.7 | 76.7 | 600 | Minced | Non | No emulsion | | 1.7 |

* SGI South Georgia Island ()South Orkney Island (*) Phospholipids enriched emulsion from the light phase discharge of the separator centrifuge Example 3

Using Melting with Different Residence Times of the Krill in the Melting Heater of the Present Invention Table 3 shows the phospholipids content in the krill oil obtained from the present invention using different residence times of the krill in the melting heater.

The tests were carried out at sea, on board a factory vessel running a pilot plant working continuously using fresh raw krill with a storage life of 1-3 hours after catch. Krill was captured in South Georgia Island in June 2013 in the low fat period.

The fresh krill, in all these tests, was minced using a screw pump with a rotor speed of 90 rpm while it was continuously fed to the cooker. The first partial cooking step used a continuous screw cooker with indirect steam heating at a continuously for 2-3 hours with 200 kg krill and a residence time of 80 seconds (screw speed 8 rpm) for the krill inside the melting heater.

The different residence time tests applied to the melting heater, worked separately from each other followed by the same processing steps as indicated in Example 1, from decanting step c) to the evaporating step g), according of the present invention.

Table 3 shows that increase in total phospholipids count in the krill oil as the residence time increase for the krill inside the melting heater.

TABLE 3

Phospholipids content in krill oil using melting equipment with different residence time

| Date/Fishing Ground (2013) | Raw krill | | | | Melting residence time (seconds)** | Phosphol. Emulsion** | | Total phospholipids in krill oil w/w(%) |
| --- | --- | --- | --- | --- | --- | --- | --- | --- |
| | Lipids (%) | Water (%) | Qty. Used (kg) | Minced | | Phospholipids (%) | Water (%) | |
| 22 jun/SGI * | 3.4 | 76.7 | 350 | Minced | 35 | 2.7 | 7.1 | 2.9 |
| 22 jun/SGI | 3.4 | 76.7 | 350 | Minced | 62 | 14.6 | 53.3 | 31.3 |
| 27 jun/SGI | 2.9 | 78.3 | 500 | Minced | 62 | 14.7 | 61.8 | 38.5 |
| 28 jun/SGI | 2.8 | 77.9 | 200 | Minced | 80 | 18.9 | 57.2 | 44.1 |

* SGI: South Georgia Island
**Phospholipids enriched emulsion from the light phase discharged from the separator centrifuge

Example 4

Phospholipids Content in Krill Oil Obtained When the Melting Heater is Used With Different Live Steam Pressure Table 4 shows the phospholipids content in the krill oil obtained from the present invention using different live steam pressure injection applied to the krill in the melting heater.

The raw krill was captured in South Georgia Island in the low fat period.

For tests carried out on 20 Jun. 2013, the pilot plant using the process of the present invention worked for about 6 hours using the melting heater with live steam injection at a pressure of about 1-2 bar and a residence time of 62 seconds (screw speed 12 rpm) being the krill temperature at the exit of the melting heater of about 92-96° C.

For tests carried out on 22 Jun. 2013, the pilot plant using the process of the present invention worked for about 3-4 hours using the melting heater with live steam injection at a pressure of about 3-5 bar and a residence time of 62 seconds (screw speed of 12 rpm) being the krill temperature at the exit of the melting heater of 97-98° C.

For the above different live steam pressure tests, the following process steps were applied according of the present invention:

a) The fresh krill was minced using a screw pump with a rotor speed of 90 rpm while it was continuously fed to the cooker. The first partial cooking step used a continuous screw cooker with indirect steam heating at a screw speed of about 3 rpm with a krill residence time of about 9 minutes and an exit temperature of 55-63° C.

b) The melting was applied immediately after the partial cooking using live steam injection at different steam pressure using a continuous cylindrical melting equipment with 12-steam injection nozzles distributed throughout the entire length of the equipment using 62 seconds of residence time.

c) The melted krill at 92-98° C. passed through a decanter centrifuge at 5.050 rpm and a differential speed of 14 rpm producing decanter solid and a decanter liquid.

d) The decanter solid, at about 80-90° C., was pressed using a continuous single twin press at a speed of 1 rpm, generating a press liquid and a press cake. Table 7 of example 6 shows the average quality of krill meal obtained from the press cake.

e) The press liquid from both tests, using the melting heater at a different live steam pressure, was fed separately to a separator centrifuge at a temperature of 90-95° C. obtaining from the light phase discharge a phospholipids enriched emulsion with a phospholipids content shown on table 4.

f) Thereafter, the water from the emulsion was evaporated using a laboratory thin film evaporator using a temperature of about 70-89° C., a pressure of about 25-30 mbar and a residence time of about 20-30 minutes. Using above operational evaporation conditions the water was easily removed to less than 1%.

Below table 4 shows that the total phospholipids content of the present invention is higher when live steam pressure is increased in the melting heater.

TABLE 4

Phospholipids content in krill oil obtained when the melting equipment is used with different live steam pressure

| Date/Fishing Ground (2013) | Raw krill | | | | Melting steam Pressure (bar) | Krill at temperature exit of Melting (° C.) | Phosphol. Emulsion** | | Total phosphoslipids in krill oil w/w(%) |
| --- | --- | --- | --- | --- | --- | --- | --- | --- | --- |
| | Lipids (%) | Water (%) | Qty. Used (kg) | Minced | | | Phospholipids (%) | Water (%) | |
| 20 jun/SGI | 3.1 | 76.9 | 400 | Minced | 1-2 | 92-96 | 14.8 | 35.9 | 23.1 |
| 22 jun/SGI | 3.4 | 76.7 | 350 | Minced | 3-5 | 97-98 | 14.6 | 53.3 | 31.3 |

*SGI South Georgia Island
**Phospholipids enriched emulsion from the light phase discharge of the separator centrifuge

Example 5

Composition of the Phospholipids' Enriched Krill Emulsion of the Present Invention Example 5, Table 5 and Table 6, show the composition characteristics of the phospholipids enriched emulsion with DHA and EPA linked to the phospholipids fraction obtained from test using minced krill of the present experiment. The shown high content of free fatty acid (8.8% and 18.6%) specially for the sample 5B and 6B it is probably due to krill's catch period (July) when this species is in its seasonal starvation period, when the free fatty acid content increases significantly (Virtue, P, Nicols, S. And Nichols, P. D. 1993. Marine Biology Vol 117). A high free fatty acid content does not have a relationship to a deterioration of the raw material as in this test raw krill material was extremely fresh, processed 1-2 hours after catch. This seasonal behaviour of krill also explains the high content of cholesterol, sterols, the low content of triacylglycerol and a mid level of EPA (8.7%) and DHA (4.8%) found on the trial period.

Example 5, Table 5 and Table 6, show the composition characteristics of the phospholipids-enriched emulsion with DHA and EPA linked to the phospholipids fraction obtained from test using the melting of the minced raw krill of the present experiment. The high content of free fatty acid (18.6%) it is probably due, as indicated before, to the krill's catch period (July) when this species is in its seasonal starvation period, when the free fatty acid content increases significantly (Virtue, P. , Nicols, S. and Nichols, P. D. 1993. Marine Biology Vol 117). A high free fatty acid content does not have a relationship to a deterioration of the raw material as in this test raw krill material was extremely fresh, processed 1-3 hours after catch. This seasonal behaviour of krill also explains the high content of cholesterol, sterols, the low content of triacylglycerol and a mid level of EPA (7.4%) and DHA (4.0%) found on the trial period.

It will also be appreciated that the krill is a live resource that varies between and within the same school biomass. Therefore, free fatty acid content is attributable to the resource condition. It is not process dependent.

TABLE 5

Lipid class composition (% total lipid) of Krill Samples

| Lipid class | 5A PL Jul. 3, 2013 | 5B PL Jul. 4, 2013 |
|---|---|---|
| Sterol esters | 6.0 | 17.5 |
| Triacylglycerols | 27.2 | 9.0 |
| Free fatty acids | 8.8 | 18.6 |
| Cholesterol/sterols | 10.0 | 11.4 |
| Diacylglycerol | 2.0 | — |
| Total neutral lipids | 54.0 | 56.5 |
| Phosphatidylethanolamine | 8.3 | 9.5 |
| Phosphatidic acid/Phosphatidylglycerol/cardiolipin | <LOQ | <LOQ |
| Phosphatidylinositol | 0.6 | 0.6 |
| Phosphatidylserine | 2.8 | <LOQ |
| Phosphatidylcholine | 29.3 | 30.2 |
| Sphingomyelin | <LOQ | <LOQ |
| Lysophosphatidylcholine | 2.8 | 1.7 |
| Pigmented material | 2.2 | 1.5 |
| Total polar lipids | 46.0 | 43.5 |

Above values calculated from analyses performed in duplicate, as determined by HPTLC

TABLE 6

Fatty acid composition (% total fatty acids and mg FA · 100 g$^{-1}$) of total lipid from Krill Samples

| | 6A PL Jul. 3, 2013 | | 6B PL Jul. 4, 2013 | |
|---|---|---|---|---|
| Fatty acid | % | mg. 100 g$^{-1}$ | % | mg. 100 g$^{-1}$ |
| 14:0 | 14.50 | 4233.31 | 13.94 | 3836.81 |
| 15:0 | 0.54 | 158.15 | 0.50 | 138.12 |
| 16:0 | 23.99 | 7004.81 | 24.03 | 6615.08 |
| 18:0 | 1.80 | 524.21 | 1.78 | 489.03 |

TABLE 6-continued

Fatty acid composition (% total fatty acids and mg FA · 100 g$^{-1}$) of total lipid from Krill Samples

| | 6A PL Jul. 3, 2013 | | 6B PL Jul. 4, 2013 | |
|---|---|---|---|---|
| Fatty acid | % | mg. 100 g$^{-1}$ | % | mg. 100 g$^{-1}$ |
| 20:0 | 0.11 | 32.76 | 0.09 | 25.92 |
| 22:0 | 0.09 | 27.50 | 0.09 | 24.76 |
| 24:0 | <LOQ | <LOQ | <LOQ | <LOQ |
| Total saturated | 41.03 | 11980.75 | 40.43 | 11129.72 |
| 16:1n-9 | 0.87 | 255.23 | 0.83 | 229.04 |
| 16:1n-7 | 11.32 | 3306.23 | 10.39 | 2860.68 |
| 17:1 | 0.36 | 105.57 | 0.30 | 83.96 |
| 18:1n-9 | 17.28 | 5045.10 | 16.92 | 4657.41 |
| 18:1n-7 | 8.22 | 2398.98 | 7.95 | 2189.04 |
| 20:1n-11 | 0.11 | 33.17 | 0.10 | 26.70 |
| 20:1n-9 | 1.23 | 358.37 | 1.26 | 347.43 |
| 20:1n-7 | 0.49 | 144.40 | 0.48 | 133.09 |
| 22:1n-11 | <LOQ | <LOQ | <LOQ | <LOQ |
| 22:1n-9 | 0.46 | 133.88 | 0.62 | 169.46 |
| 24:1n-9 | <LOQ | <LOQ | 0.11 | 29.40 |
| Total monounsaturated | 40.34 | 11780.93 | 38.97 | 10726.20 |
| 18:2n-6 | 1.50 | 437.24 | 1.45 | 399.66 |
| 18:3n-6 | 0.21 | 62.69 | 0.20 | 55.33 |
| 20:2n-6 | <LOQ | <LOQ | 0.07 | 18.96 |
| 20:3n-6 | <LOQ | <LOQ | <LOQ | <LOQ |
| 20:4n-6 | 0.23 | 67.55 | 0.25 | 69.64 |
| 22:4n-6 | <LOQ | <LOQ | <LOQ | <LOQ |
| 22:5n-6 | <LOQ | <LOQ | <LOQ | <LOQ |
| Total n-6 PUFA | 1.94 | 567.49 | 1.97 | 543.58 |
| 18:3n-3 | 0.57 | 167.46 | 0.57 | 157.85 |
| 18:4n-3 | 2.05 | 599.85 | 2.11 | 579.56 |
| 20:3n-3 | 0.08 | 23.86 | 0.07 | 20.12 |
| 20:4n-3 | 0.17 | 49.35 | 0.18 | 49.91 |
| 20:5n-3 | 7.43 | 2170.04 | 8.70 | 2394.09 |
| 22:5n-3 | 0.23 | 67.55 | 0.26 | 72.35 |
| 22:6n-3 | 4.04 | 1180.28 | 4.80 | 1322.01 |
| Total n-3 PUFA | 14.58 | 4258.38 | 16.70 | 4595.89 |
| 16:2 | 0.91 | 265.74 | 0.85 | 234.07 |
| 16:3 | 0.22 | 64.31 | 0.17 | 46.43 |
| 16:4 | 0.97 | 284.35 | 0.91 | 251.09 |
| | 2.10 | 614.41 | 1.93 | 531.59 |
| Total PUFA | 18.63 | 5440.28 | 20.60 | 5671.06 |
| Total | 100 | 29201.96 | 100 | 27526.99 |

Limit of quantification (LOQ) for fatty acid analysis is 0.06%

Example 6

TABLE 7

Krill meal composition obtained from press cake of the test carried out on 22 Jun. 2013 of the present invention

| | Krill meal composition ** | | | | |
|---|---|---|---|---|---|
| Date/Fishing Groung | Moisture (%) | Proteins (%) | Lipids (%) | Ash (%) | Astaxanthin (ppm) |
| 22 jun/SGI * | 6.5 | 65.3 | 10.2 | 10.9 | 81 |

* SGI: South Georgia Island
** Krill meal obtained using rotatube dryer with a steam pressure 3-5 bar While the disclosure has been described in terms of specific embodiments, it is evident in view of the foregoing description that numerous alternatives, modifications and variations will be apparent to those skilled in the art.

Accordingly, the disclosure is intended to encompass all such alternatives, modifications and variations which fall within the scope and spirit of the disclosure and the following claims.

The invention claimed is:

1. A solvent-free process for preparing krill oil comprising:
   a) mincing or grinding whole raw krill and/or a krill fraction to form minced krill;
   b) preheating the minced krill to a maximum temperature of 60° C. for a at least 1 minute,
      wherein the preheating is carried out using an indirect and/or direct steam heating system and at low rotation speed of 1-300 rpm;
   c) contacting the preheated minced krill with a direct steam injection at a high pressure of 3 to 6 bar for 1 to 10 minutes until the preheated minced krill reaches a temperature of at least 97° C. to melt the phospholipids in the minced krill;
   d) separating the de-fatted and de-watered solid and a liquid from the melted krill;
   e) squeezing the de-fatted and de-watered melted solid to provide a press liquid emulsified by the action of step c), having residual solid particles and a solid fraction;
   f) separating residual solid particles from the emulsified press liquid to obtain a substantially residual solid particles, and emulsified particle-free press liquid; and
   g) separating by centrifuge the emulsified press liquid from step f) to obtain from a light phase discharge an emulsion comprising krill oil enriched in phospholipids with Eicosapentaenoic acid (EPA) and Docosahexaenoic acid (DHA) water, proteins and astaxanthin,
   h) removing the water from the emulsion to obtain a dried krill oil enriched in phospholipids with EPA and DHA in combination with astaxanthin.

2. The process according to claim 1, wherein the liquid from step d) is phase separated into krill oil enriched in neutral lipids and stickwater.

3. The process according to claim 1, wherein the mincing or grinding of step a) is carried out using a screw pump, a meat grinder with plates containing holes or a fish deboner.

4. The process according to claim 1, wherein the minced krill is about 1-20 mm in length or diameter.

5. The process according to claim 1, wherein the minced krill is preheated to a temperature of about 20-60° C.

6. The process according to claim 1, wherein the preheated minced krill is heated and melted to a temperature of about 100-200° C.

7. The process according to claim 1, wherein the direct steam injection is applied through a tube or cylinder system having a screw conveyor and several nozzles that inject steam either partially or throughout the entire length of the tube or cylinder system.

8. The process according to claim 7, wherein the krill is melted, regulating the residence time, using a screw conveyor working at a rotation speed of about 1-100 rpm.

9. The process according to claim 1, wherein the separating in steps d) and f) is carried out using a decanter, wherein the torque of the decanter is about 1-100 kNm, and
   wherein the decanter has a speed of about 100-10,000 rpm.

10. The process according to claim 9, wherein the decanter is a two-phase decanter or a triple-phase decanter.

11. The process according to claim 1, wherein the squeezing of the partially de-fatted and de-watered melted solid in step e) is carried out by feeding said solid to a screw pump and/or a screw conveyor, and pressing the melted solid using a screw press with a speed of about 1-100 rpm.

12. The process according to claim 1, wherein the squeezing of the partially de-fatted and de-watered melted solid in step e) is carried out by feeding the solid to a screw pump and/or a screw conveyor and/or any other feeding system
   avoiding agitation, and pressing the melted solid using a screw press and wherein the temperature of the de-watered solid is about 50-125° C.

13. The process according to claim 11 wherein the screw press in step e) is a simple screw press or a twin-screw press.

14. The process according to claim 1, wherein the phase-separation in step g) is carried out using a separator centrifuge, wherein the separator centrifuge is operated at a temperature of about 10-140° C.

15. The process according to claim 1, wherein the water in step h) is removed by evaporation, wherein the evaporation is carried out using a vacuum pressure of about 10-80 mbar.

16. The process according to claim 15, wherein the water content of the dried krill oil is less than 8%.

17. The process according to claim 1, wherein the dried krill oil is characterized by a phophatidylethalolamine content greater than 8.3% from the total lipids, or above 18% out of the total phospholipids content.

18. The process according to claim 17, wherein the phophatidylethalolamine content is about 9.5% from the total lipids, or about 20% out of the total phospholipids content.

19. The process according to claim 1, wherein the preheated minced krill is contacted with direct steam injection at a pressure of about 300-600 kPa.

* * * * *